United States Patent Office 2,861,067
Patented Nov. 18, 1958

2,861,067

METALLISABLE AZO DYESTUFFS

Herbert Francis Andrew and Robert Ronald Davies, Manchester, England, assignors to Imperial Chemical Industries Limited, London, England, a corporation of Great Britain No Drawing. Application October 31, 1955
Serial No. 544,083

Claims priority, application Great Britain
November 3, 1954

6 Claims. (Cl. 260—155)

This invention relates to new metallisable azo dyestuffs and more particularly it relates to metallisable azo dyestuffs derived from certain quinoline derivatives.

There have been described in U. S. application Serial No. 464,595 metallisable azo dyestuffs characterised in that they contain the group:

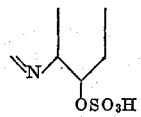

wherein the nitrogen atom is part of a heterocyclic ring.

Also, in U. S. application Serial No. 532,761, now U. S. Patent 2,794,797, there have been described metallisable azo dyestuffs characterised in that they contain the group:

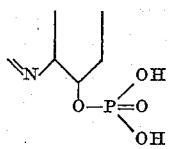

wherein the nitrogen is part of a heterocyclic ring. Also, in U. S. application Serial No. 544,082 of even date herewith, there have been described metallisable azo dyestuffs characterized in that they contain the group:

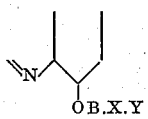

wherein the nitrogen atom is part of a heterocyclic ring and wherein B stands for CO or $SO_2$, X stands for a bridging groups which may be for example —$CH_2$—, —CHCl—, —$C_6H_4$—, —$C_4H_2O$— and —$C_6H_4.CH_2$—, and Y stands for $CO_2H$, $SO_3H$ or for a quaternary ammonium group of the form —N(tert) anion.

According to our invention we provide new metallisable azo dyestuffs of the formula:

$$Q_1\text{—N:N—D—N:N—}Q_2$$

wherein D stands for the residue of a tetrazotised primary aromatic diamine which may optionally bear substituents and $Q_1$ and $Q_2$ stand for the residues of coupling components which may be the same or different, at least one of which is a quinoline derivative of the formula:

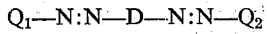
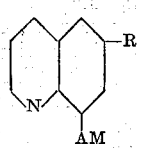

wherein A stands for an oxygen atom or an —NH— group, R stands for a hydroxy group, an alkoxy or an amino group, M stands for a solubilising group removable by metallisation, and the quinoline nucleus may optionally bear further substituents in positions other than the 5-position.

As examples of such a solubilising group removable by metallisation there may be mentioned for example the groups —$SO_3H$, —$PO_3H_2$, or the group —B.X.Y wherein B stands for CO or $SO_2$, X stands for a bridging group which may be for example —$CH_2$—, —CHCl—, —$C_6H_4$—, $C_4H_2O$— and —$C_6H_4.CH_2$—, and wherein Y stands for —$CO_2H$, for —$SO_3H$ or a quaternary ammonium group of the form —N(tert) anion.

Also according to our invention we provide a process for the manufacture of new metallisable azo dyestuffs which comprises sulphating, phosphating or treating with acylating agents, according to the processes described in the aforementioned copending applications, azo compounds of the formula:

$$Q_3\text{—N:N—D—N:N—}Q_4$$

wherein D has the meaning stated above, and $Q_3$ and $Q_4$ stand for the residues of coupling components which may be the same or different, at least one of which is a quinoline derivative of the formula:

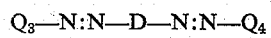
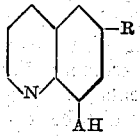

wherein A and R have the meaning stated above, and wherein the quinoline nucleus may optionally bear further substituents in positions other than the 5-position.

The said azo compounds of the formula $$Q_3\text{—N:N—D—N:N—}Q_4$$

may be obtained for example by diazotising a primary aromatic diamine and coupling the diazo compound thus obtained with two molecular proportions of a coupling component or a mixture of coupling components, at least one molecular proportion of which is a coupling component of the formula:

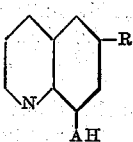

wherein A and R have the meaning stated above and the quinoline nucleus may optionally bear further substituents in positions other than the 5-position.

Alternatively, the said compounds, wherein $Q_3$ and $Q_4$ are identical, may be prepared for example by diazotising a nitro derivative of a primary aromatic amine, and subsequently either reducing the nitro group to form an azoxy or azo linkage, for example with alkaline glucose, or reducing to amino and linking two molecules of the dyestuff in the known manner, for example by reaction with phosgene. Solubilisation by sulphating, phosphating or treating with acylating agents in the aforesaid manner may be done before or after reduction of the nitro group.

As primary aromatic diamines which may be tetrazotised and coupled with coupling components according to the processes of our invention there may be used for example benzidine, 4:4'-diaminoazobenzene, 4:4'-diaminobenzanilide, 4:4' - diaminodibenzanilide, 4:4' - diaminodiphenylmethane, 1:5 - diaminonaphthalene and 4:4' - diaminodiphenylurea.

There are to be preferred those primary aromatic diamines which contain in their molecules in ortho positions with respect to the amino groups substituents which, when present in positions ortho to an azo group, are capable of taking part in a metallisation process, for example the groups —OH, —O.Alkyl, —CO₂H and —OCH₂CO₂H. These dyestuffs so obtained are generally superior in fastness properties to the corresponding dyestuffs wherein the specified substituent in the 6-position is absent. As examples of such diamines there may be mentioned 3:3'-dimethoxy - 4:4' - diaminodiphenyl, 3':4 - diamino - 3:4'-dimethoxybenzanilide, 3:3' - dihydroxy - 4:4' - diaminodiphenyl, 4:4' - diaminodiphenyl - 3:3' - dicarboxylic acid, 4:4' - diaminodiphenylurea - 3:3' - dicarboxylic acid, 4:4' - diaminoazobenzene - 3:3' - dicarboxylic acid and 4:4'-diamino-3:3'-bis(carboxymethoxy)-diphenyl.

As coupling components $Q_3$ and $Q_4$ described above and containing the stated quinoline nucleus, there may be mentioned for example 6:8-dihydroxyquinoline, 6-hydroxy - 8-aminoquinoline, 6-methoxy-8-hydroxyquinoline and 6-methoxy-8-aminoquinoline.

As coupling components which may be used in the processes of our invention, and in the manufacture of compounds used in the processes of our invention, other than those containing a quinoline nucleus substituted as specified above there may be mentioned for example phenols, naphthols, hydroxyindazoles, acetoacetarylides and pyrazolones.

In the processes of our invention, the tetrazotising of the primary aromatic diamines and the coupling of the diazo compounds thus produced with the coupling components may be carried out by known procedures. For example when the diazo compound derived from a tetrazotised primary aromatic diamine is coupled with two coupling components which are not identical, the reaction may conveniently be carried out by successively coupling with one molecular proportion of one coupling component, and then with one molecular proportion of another coupling component. When the two coupling components are identical, however, two molecular proportions of the said coupling component may be reacted with the diazo compound simultaneously.

The dyestuffs of this invention are applied to fibres by known processes, for example and those dyestuffs in which the solubilising group removable by metallisation is —SO₃H or —PO₃H₂ being applied by an acidic after-coppering process, and those in which the said group is the group —B.X.Y being applied by an alkaline after-coppering process. The dyestuffs are particularly suitable for application to cellulosic fibres, and give dyeings possessing a high degree of fastness to light and to washing.

In the process of metallisation, the solubilising group M is removed, and a metallic complex is formed which is a chelate structure involving the metal atom, the nitrogen atom in the quinoline nucleus, and the oxygen atom or —NH— group in the 8-position of the quinoline nucleus.

The dyestuffs of the present invention which are derived from the preferred primary aromatic diamines containing ortho metallisable groups are capable of taking up further quantities of metal, with complex formation at the azo linkage with metallisable groups in the ortho position with respect to the said azo linkage.

The invention is illustrated but not limited by the following examples in which the parts are by weight.

*Example 1*

1.5 parts of the compound obtained by coupling one molecular proportion of tetrazotised 4:4' - diaminobenzanilide with two molecular proportions of 6:8-dihydroxyquinoline are stirred with 6 parts of the addition product of triethylamine and sulphur trioxide at 110° for 1 hour. The reaction mixture is added to a mixture of 200 parts of water and 5 parts of soda ash, the whole is then heated to 80° C. and the resultant solution is then salted with 20 parts of sodium chloride and filtered. The solid residue is washed with 15 parts of ethanol and dried. The product thus obtained dissolves readily in water to give a yellow brown solution which dyes cellulosic fibres by the normal acidic after-coppering process in orange red shades of good fastness to light and to washing.

A dyestuff of similar properties and which gives identical after-coppered shades is obtained by phosphating the compound obtained by coupling one molecular proportion of tetrazotised 4:4-diaminobenzanilide with two molecular proportions of 6:8-dihydroxyquinoline by treatment with phosphorus pentoxide in triethylamine.

*Example 2*

A mixture of 4 parts of the product obtained by coupling one molecular proportion of tetrazotised 4:4'-diamino-3:3'-dihydroxydiphenyl with two molecular proportions of 6:8-dihydroxyquinoline, 90 parts of pyridine and 10 parts of dimethylformamide is stirred and is heated to 100° C., 20 parts of m-chloromethylbenzoyl chloride are added and the mixture is stirred at 80° C. for 2 hours and is then cooled and filtered. The solid is purified by recrystallisation from 150 parts of ethanol and is dried. The product thus obtained dissolves readily in water to give a red solution and dyes fibres from a neutral bath. When fibres thus dyed are given an alkaline after-coppering treatment, for example with an aqueous solution of a copper salt containing ammonium hydroxide or an aliphatic amine for example monoethanolamine at 85° C., there are obtained reddish blue shades of excellent fastness to light and to washing.

Dyestuffs of similar properties and which give identical after-coppered shades are obtained by acylating the compound obtained by coupling one molecular proportion of tetrazotised 4:4'-diamino-3:3'-dihydroxydiphenyl with two molecular proportions of 6:8-dihydroxyquinoline by treatment with m-sulphobenzoyl chloride or 5-sulphofuroyl chloride in pyridine.

*Example 3*

A mixture of 4 parts of the compound obtained by coupling one molecular proportion of tetrazotised 4:4'-diaminobenzanilide with two molecular proportions of 6:8-dihydroxyquinoline and 90 parts of pyridine is stirred and heated to 100° C. 20 parts of m-chloromethylbenzoyl chloride are added and the mixture is stirred at 80° C. for 2 hours and is then cooled and filtered. The solid residue is dissolved in 200 parts of hot ethanol and the resulting solution is filtered. 60 parts of acetone are added to the filtrate, the mixture is filtered and the solid residue is dried. The product dissolves readily in water to give an orange-red solution which may be applied to cellulosic fibres from a neutral bath. When fibres thus treated are given an alkaline after-coppering treatment as in Example 2, they are dyed to orange shades of excellent fastness to light and to washing.

Dyestuffs of similar properties which give similar shades when dyed on cotton and given an alkaline after-coppering treatment are obtained by acylating the compound obtained by coupling one molecular proportion of tetrazotised 4:4'-diaminobenzanilide with two molecular proportions of 6:8-dihydroxyquinoline, used in the above example, by means of m-sulphobenzoyl chloride or 5-sulphofuroyl chloride.

*Example 4*

1.5 parts of the compound obtained by coupling one molecular proportion of tetrazotised 4:4'-diamino-3:3'-dihydroxydiphenyl successively with one molecular proportion of 6:8 - dihydroxyquinoline and one molecular proportion of 6-hydroxyindazole are heated at 110–120° C. with 6 parts of the addition product of triethylamine and sulphur trioxide for about 30 minutes, until a test sample is soluble in dilute carbonate solution. The mixture is poured into 300 parts of water and 100 parts of 2 N sodium carbonate solution and the resulting mixture is heated to 90° C. and filtered. 35 parts of common salt are dissolved in the filtrate, which is then allowed to cool to 60° C. and is filtered, and the solid residue is dried. The product so obtained dissolves readily in water and dyes cellulosic fibres by the acidic after-coppering process in greenish-blue shades of good fastness to light and to washing.

*Example 5*

1.5 parts of the compound obtained by coupling one molecular proportion of tetrazotised 4:4′-diamino-3:3′-bis-(carboxymethoxy)-diphenyl successively with one molecular proportion of 6:8-dihydroxyquinoline and one molecular proportion of 1-phenyl-3-methyl-5-pyrazolone are heated with 6 parts of the addition product of triethylamine and sulphur trioxide at 110–120° C. for about 30 minutes until a test sample is soluble in water. The mixture is poured into 300 parts of water and 100 parts of 2 N sodium carbonate solution and the resultant mixture is heated to 90° C., and filtered. The filtrate is treated with 35 parts of common salt and is then cooled to 60° C. and is filtered. The solid residue is dried. The product so obtained dissolves readily in water and dyes cellulosic fibres, by the acidic after-coppering process, in violet shades of good fastness to light and washing.

*Example 6*

The following table illustrates the shades of the dyeings which may be produced, for example on cellulosic materials, by the use of dyestuffs obtained by sulphating the compounds obtained by coupling a tetrazotised primary aromatic diamine with two molecular proportions of 6:8-dihydroxy-, 6-methoxy-8-hydroxy-, 6-hydroxy-8-amino-, or 6-methoxy-8-aminoquinoline.

Dyestuffs with similar properties to those tabulated and giving identical after-coppered shades are obtained from the corresponding compounds obtained by coupling a tetrazotised primary aromatic diamine with two molecular proportions of the corresponding 6:8-disubstituted quinoline by phosphating or treating with appropriate acylating agents.

| Diamine | Coupling Component | After-coppered shade on cotton |
|---|---|---|
| 4:4′-Diaminoazobenzene | 6:8-dihydroxyquinoline. | Violet. |
| 3:3′-Dihydroxy-4:4′-diaminodiphenyl. | do | Reddish blue. |
| 4:4′-Diaminodiphenyl-3:3′-dicarboxylic acid. | do | Red violet. |
| 4:4′-Diaminodiphenylurea-3:3′-dicarboxylic acid. | do | Red brown. |
| 4:4′-Diaminoazobenzene-3:3′-dicarboxylic acid. | do | Blue brown. |
| 4:4′-Diamino-3:3′-bis-(carboxymethoxy)-diphenyl. | do | Red blue. |
| 4:4′-Diaminobenzanilide | do | Orange red. |
| Do | 6-Methoxy-8-hydroxyquinoline. | Do. |
| 4:4′-Diaminodiphenylamine | do | Grey. |
| 4:4′-Diamino-3:3′-dihydroxydiphenyl. | 6-Hydroxy-8-aminoquinoline. | Greenish blue. |
| 4:4′-Diamino-3:3′-bis-(carboxymethoxy)-diphenyl. | do | Blue. |

*Example 7*

20 parts of the compound obtained by coupling one molecular proportion of diazotised 5-nitro-2-aminophenol with one molecular proportion of 6:8-dihydroxyquinoline are heated with 60 parts of the addition product of triethylamine and sulphur trioxide at 125–130° C. for 1 hour. The reaction mixture is added to a mixture of 100 parts of water and 550 parts of 2 N sodium carbonate solution, and the whole is then added at 80° C. for 10 minutes and then cooled to 0° C. and filtered. The solid is dissolved in 600 parts of water, a solution of 25 parts of sodium sulphide crystals in 100 parts of water is added and the mixture is heated at 80° C. for 7 hours. 20 parts of sodium bicarbonate are added, the temperature of the mixture is adjusted to 60° C. and heating at 60° C. is continued for 15 minutes. 50 parts of salt are then added, the mixture is stirred at 0° C. for 1 hour and then filtered. The solid is washed with 50 parts of 20% brine containing ½ part of sodium bicarbonate, and is then dried under vacuum.

4 parts of the dried solid are dissolved in 200 parts of water, together with sufficient 2 N sodium carbonate solution to maintain the mixture alkaline to Brilliant Yellow. 7 parts of 2 N sodium nitrite solution are added and the resultant mixture is added to a stirred mixture of ice and 3 parts of 36% hydrochloric acid and stirred for 10 minutes. Excess nitrous acid is then removed by addition of sulphuric acid, and the diazo suspension thus obtained is added to a solution of 2-acetylamino-4-hydroxybenzthiazole in a mixture of 50 parts of water, 100 parts of β-ethoxyethanol and 2 parts of 2 N sodium hydroxide solution, together with sufficient 2 N-sodium carbonate solution to maintain the final mixture alkaline to Brilliant Yellow. The mixture is stirred for 16 hours at a temperature below 10° C. and then filtered and the solid is washed thoroughly with water and dried under vacuum. The product thus obtained dissolves readily in water to give a red solution which dyes cellulosic fibres from a neutral bath. When fibres thus dyed are given an acidic after-coppering treatment there are obtained bright blue shades of excellent fastness to light and washing.

The following table illustrates the shades of dyeings produced, for example on cellulosic materials by dyestuffs obtained by replacing the 2-acetylamino-4-hydroxybenzthiazole in Example 8 by alternative coupling components which may be capable of metallisation per se and by replacing 6:8-dihydroxyquinoline by either 6-amino-8-hydroxyquinoline or 8-amino-6-hydroxyquinoline.

The 6-amino-8-hydroxyquinoline, M. P. 172° C., may be prepared by an alcoholic iron reduction of 6-nitro-8-methoxyquinoline and demethylation of the resulting 6-amino-8-methoxyquinoline.

| Aminoazo compound | Coupling Component | After-coppered shade on cotton |
|---|---|---|
| 5-nitro-2-aminophenol diazotised and coupled with 6:8-dihydroxyquinoline, sulphated and reduced. | 8-hydroxyquinoline | Reddish navy blue. |
| Do | 8-hydroxyquinoline-7-sulphonic acid. | red blue. |
| Do | salicylaldoxime | red navy blue. |
| Do | 2-amino-4-hydroxybenzthiazole. | bright blue. |
| 5-nitro-2-aminophenol, diazotised and coupled with 8-amino-6-hydroxyquinoline, sulphated and reduced. | 8-hydroxyquinoline | red navy blue. |
| Do | 6-chloro-8-hydroxyquinoline. | Do. |
| Do | 6-amino-8-hydroxyquinoline. | blue violet. |
| Do | 8-amino-6-hydroxyquinoline. | green blue. |
| Do | 6:8-dihydroxyquinoline. | blue grey. |
| Do | 2-acetylamino-4-hydroxybenzthiazole. | navy blue. |
| Do | salicylaldoxime | red navy blue. |
| 5-nitro-2-aminophenol diazotised and coupled with 6-amino-8-hydroxyquinoline, sulphated and reduced. | 2-acetylamino-4-hydroxybenzthiazole. | grey. |

*Example 8*

A mixture of 8.7 parts of the compound obtained by coupling one molecular proportion of diazotised 5-nitro-2-aminophenol with one molecular proportion of 8-amino-6-hydroxyquinoline and 12 parts of the addition compound from triethylamine and sulphur trioxide are heated at 110–120° C. for 2 hours after which time a test sample is soluble in dilute sodium carbonate solution. The mixture is poured into 240 parts of water and 62 parts of 2 N sodium carbonate solution, the solution is heated to 90° C. and filtered. 34 parts of common salt are added to the filtrate which is then cooled and filtered. The solid on the filter is washed with water and dried. 4.05 parts of the dried compound are dissolved in 150 parts of water and the solution made alkaline to Clayton Yellow by the addition of 2 N sodium hydroxide solution. A solution of 3 parts of glucose in 20 parts of water are added and the mixture is stirred at 60–65° C. for 1 hour, after which time 5 parts of sodium bicarbonate are added, followed by 20 parts of salt. The mixture is then heated to 80° C. and is filtered. The residue is washed with water and dried. The product so obtained dissolves readily in water and dyes cellulosic fibres by the acidic after-coppering process in blue shades of excellent fastness to light and washing.

By replacing the 8-amino-6-hydroxyquinoline in the above example by an equivalent amount of 6:8-dihydroxyquinoline, a dyestuff is obtained which is readily soluble in water and dyes cellulosic fibres by the acidic after-coppering process in rubine shades of excellent fastness to light and washing.

*Example 9*

3 parts of the compound prepared by sulphation and reduction of the azo compound obtained by coupling one molecular proportion of 5-nitro-2-aminophenol with one molecular proportion of 6:8-dihydroxyquinoline, as described in Example 7, are dissolved in a mixture of 200 parts of water and 5 parts of 2 N sodium carbonate solution. Phosgene is passed through the solution for 1 hour at 50° C., the solution being kept alkaline throughout by addition of 4 parts of sodium carbonate. The mixture is then filtered, the solid residue is washed with water and dried. The product so obtained dissolves readily in water and dyes cellulosic fibres by the acidic after-coppering process in attractive blue-violet shades of excellent fastness to light and washing.

By replacing the 6:8-dihydroxyquinoline in the above example by an equivalent amount of 8-amino-6-hydroxyquinoline, a dyestuff is obtained which is readily soluble in water and dyes cellulosic fibres by the acidic after-coppering process in violet shades of excellent fastness to light and washing.

What we claim is:

1. A metallizable azo dyestuff of the formula:

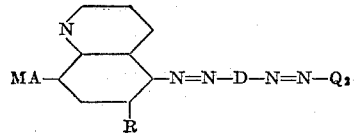

wherein D stands for the residue of a primary aromatic diamine, $Q_2$ stands for the residue of a coupling component selected from the group consisting of 6:8-dihydroxyquinoline, 6-hydroxy-8-aminoquinoline, 6-methoxy-8-hydroxyquinoline, 6-methoxy-8-aminoquinoline, 6-hydroxyindazole, 1-phenyl-3-methyl-5-pyrazolone, 8-hydroxyquinoline, 8-hydroxyquinoline-7-sulphonic acid, salicylaldoxime, 2-amino-4-hydroxybenzthiazole, 6-chloro-8-hydroxyquinoline and 2-acetylamino-4-hydroxybenzthiazole, A is selected from the group consisting of —O— and —NH—, R is selected from the group consisting of hydroxy, methoxy and amino, and M is selected from the group consisting of —SO$_3$H, —PO$_3$H$_2$, —CO—R$_1$—SO$_3$H, and —CO—R$_1$—X where R$_1$ is selected from the group consisting of —C$_6$H$_4$—, —C$_4$H$_2$O— and C$_6$H$_4$—CH$_2$—, and X is a tertiary amino group.

2. A metallizable dyestuff as claimed in claim 1 wherein D contains two metallizable groups each of which is in an ortho position to an azo group.

3. A metallizable dyestuff as claimed in claim 1 wherein M is a m-sulphobenzoyl group.

4. A metallizable dyestuff as claimed in claim 1 wherein M is a 5-sulphofuroyl group.

5. A metallizable dyestuff as claimed in claim 1 wherein M is a chloride of a m-(1-pyridiniumylmethyl) benzoyl residue.

6. A metallizable dyestuff as claimed in claim 1 wherein $Q_2$ stands for the residue of 6:8-dihydroxyquinoline and M stands for an —SO$_3$H group.

References Cited in the file of this patent

UNITED STATES PATENTS

| | | |
|---|---|---|
| 1,074,946 | Hauptmann | Oct. 7, 1913 |
| 2,234,724 | Dickey | Mar. 11, 1941 |
| 2,283,294 | Straub et al. | May 19, 1942 |
| 2,495,244 | Felix et al. | Jan. 24, 1950 |
| 2,794,797 | Davies et al. | June 4, 1957 |

FOREIGN PATENTS

| | | |
|---|---|---|
| 643,699 | Germany | Apr. 15, 1937 |
| 546,017 | Great Britain | June 24, 1942 |